(12) United States Patent
Li (10) Patent No.: US 6,719,204 B2
(45) Date of Patent: Apr. 13, 2004

(54) MATHIEU-GAUSSIAN BEAM FOR OPTICAL SCANNERS

(75) Inventor: Yajun Li, Oakdale, NY (US)

(73) Assignee: Symbol Technologies, Inc., Holtsville, NY (US)

(*) Notice: Subject to any disclaimer, the term of this patent is extended or adjusted under 35 U.S.C. 154(b) by 10 days.

(21) Appl. No.: 10/116,528

(22) Filed: Apr. 4, 2002

(65) Prior Publication Data

US 2003/0189097 A1 Oct. 9, 2003

(51) Int. Cl.[7] .................................................. G06K 7/10
(52) U.S. Cl. .......................... 235/462.22; 235/462.01; 235/462.32; 235/454
(58) Field of Search .................................. 235/454, 462

(56) References Cited

U.S. PATENT DOCUMENTS 5,525,810 A * 6/1996 Jewell et al. ............... 250/566
6,282,963 B1 * 9/2001 Haider ......................... 73/602
6,488,208 B1 * 12/2002 Runge et al. .......... 235/462.01

OTHER PUBLICATIONS

"Alternative Formulation for Invariant Optical Fields: Mathieu Beams" from the Oct. 15, 2000 edition of Optics Letters.

* cited by examiner

Primary Examiner—Michael G. Lee
Assistant Examiner—Daniel A. Hess (57) ABSTRACT

A laser beam having a Mathieu-Gaussian intensity profile is provided, which may be used for various optical scanning applications at various scanning distances. The Mathieu-Gaussian beam exhibits a zone of illumination characterized by a central spot and side lobes centered on an axis of elongation of the zone of illumination. The zone of illumination may be used with scanners that either generate a single scan line, or another omni- or multi-directional raster pattern, to scan symbols over large variations of distance.

18 Claims, 6 Drawing Sheets

FIG.8

MATHIEU-GAUSSIAN BEAM FOR OPTICAL SCANNERS

FIELD OF THE INVENTION

The present invention relates generally to diffraction-free beams of coherent light. More specifically, the present invention relates to the provision of a Mathieu-Gaussian beam, which can be used in optical scanners or optical communication systems.

BACKGROUND AND OBJECTS

Optical scanning technologies have enjoyed widespread use in recent years. Because of this widespread use, substantial efforts have been directed to finding improved techniques for optical scanning. Additionally, the field of optical communications has also grown in recent years, and likewise has spurred a desire to find new optical technologies to improve such communication.

For example, in the field of barcode scanning, many different types of scanning beams have been experimented with to obtain ideal scanning characteristics of the beams. Traditionally, a beam having a Gaussian profile is readily obtained from a laser diode and has advantages in scanning applications. Also, beams generated by way of edge-emitting laser diodes generally have elliptical cylindrical symmetry, also known as confocal symmetry, which is easily describe in terms of confocal coordinates, and which is advantageous in scanning elongated objects such as bars within a barcode, such as a universal product code (UPC) symbol, elements of a portable data file (PDF 417), or the like.

Generally, a beam having confocal symmetry and Gaussian properties is oriented in a manner such that the beam's major axis is aligned with the axis of elongation of each element of a barcode, where the axis of elongation is the axis parallel to the longest side of each bar within a barcode. Such scanning is accomplished as a beam, incident upon a symbol (e.g., a barcode), which lies in a plane parallel to the direction of propagation of the beam. The dimension of the beam cross-section at the plane containing the symbol is generally referred to as the "spot size." Because of the relative similarity of an elliptical beam's spot size to the size and shape of the bars of a barcode, it is able to produce a reflected signal more readily read by conventional barcode readers.

One of the requirements for effective scanning is an adequate working range, in other words the range of distances from the scanner that the barcode symbol may be placed and still be decoded. It is typically only over a limited working range that the cross-section of the beam has an appropriate size and shape to allow reliable code reading. This is particularly evident where the beam is provided by way of a laser diode, since these exhibit substantial astigmatism. Typically, the application of shaping optics applied to such a beam creates a scanning beam in which the cross-section varies with distance from the scanner. The point at which the x-dimension of the beam cross-section is narrowest (the "x-waist") may be at a different distance from that at which the y dimension is narrowest (the "y-waist"). Such astigmatism can be problematic for scanning over substantial distances.

It is well known that Gaussian beams, when used for scanning a target, provide a signal with excellent contrast. However, Gaussian beams suffer from limited working ranges, and the smaller the beam waists are designed to be, the shorter the working ranges become. Since the working ranges are effectively those where the beam cross-sections remain essentially constant, these correspond generally with the Rayleigh ranges.

In one case, it has been found advantageous to use a combination of Bessel and Gaussian beams to produce a Bessel-Gaussian beam. One such technique is described in copending application Ser. No. 09/867,399, filed May 31, 2001 by Bergstein et al. entitled "Beam Shaping for Optical Scanners", the disclosure of which is hereby incorporated by reference in its entirety. In this copending application, the technique whereby a Bessel-Gaussian beam, which is a coherent combination of a Bessel beam and a Gaussian beam, is described. This Bessel-Gaussian beam enjoys the advantages of Gaussian and non-Gaussian beams alike. One major advantage of the Bessel-Gaussian beam is the fact that it is essentially diffraction-free.

However, in some applications wherein a diffraction free beam is desired, the ringed structure of the Bessel beam that is used to form the Bessel-Gaussian beam for scanning purposes may not be desirable. In such cases, invariant optical fields (IOFs) may be desirable because under ideal conditions, they are essentially diffraction free, propagating essentially indefinitely without a change in their transverse intensity distribution. One such IOF known as a Mathieu beam is discussed in J. C. Gutierrez-Vega, M. D. Iturbe-Castillo, and S. Chávez-Cerda, "Alternative Formulation for Invariant Optical Fields: Mathieu Beams," *Optics Letters*, Vol. 25, No. 20, 1493–95, (Oct. 15, 2000). The Mathieu Beam is one of many solutions to the Helmholtz wave equation in elliptical cylindrical coordinates. The Mathieu Beam has infinite transverse extension in one direction, when the ideal model is considered. Thus, the ideal Mathieu beam is unsuited for practical application such as barcode reading.

It is an object of the present invention to provide a scanning beam, and source thereof which is usable with a wide range of optical code densities regardless of where the target symbol is located in the working range of the code reader.

It is another object of the present invention to provide a laser beam which is essentially diffraction free.

It is another object of the present invention to provide a laser beam which has an invarient optical field through the working range of a code reading or communications system in which it is employed.

It is another object of the present invention to provide a laser beam having a zone of illumination which is of essentially constant size through the working range of a code reading or communication system in which it is employed.

It is another object of the present invention to provide a laser beam for scanning barcodes which has an essentially constant, elliptically-shaped zone of illumination throughout the working range of the code reader.

These and other objects and features will be apparent from the following written description and drawings. It being understood that specific embodiments of the present invention may achieve only one or some of the objects stated in this application, and may achieve additional objects not stated in this application.

SUMMARY OF THE INVENTION

It would be desirable to produce a beam that has the advantages of the inherent ellipticity and diffraction-free nature of the ideal Mathieu beam, while controlling the infinite transverse extension in one direction of the beam. Such a beam should also maintain an essentially constant irradiance (W/m²), which is radiant power (generally described in terms of Watts) per area (generally described in square meters).

Such a beam would also be desirable in the field of optical communications, as the properties that make such a beam desirable for scanning applications also make it desirable for communications purposes. Specifically, a beam that is essentially diffraction free, having a nearly constant irradiance and spot size of a large distance would be usefully in many point-to-point communications systems.

Accordingly, the present invention achieves the foregoing objectives by providing a beam, and a method for making the beam that utilizes the advantages of the Mathieu beam, while controlling its infinite transverse extension in one direction. The beam created in accordance with the present invention is essentially diffraction free, and has a nearly constant irradiance and spot size over large distances.

The present invention makes use of Gaussian apodization to produce a Mathieu-Gaussian beam which has a spot size and irradiance that remains substantially constant over a varying distance. The Mathieu-Gaussian beam has a long elliptical irradiance profile, which may be used in barcode scanning and communications applications. In accordance with an embodiment of the present invention, the Mathieu-Gaussian beam may be used to generate a single scan line in the far field for scanning barcodes. Also in accordance with an embodiment of the present invention, the Mathieu-Gaussian beam may also be used in the near field to produce a desirable narrow raster scan pattern or other omni- or multi-directional pattern.

In accordance with one embodiment of the present invention, an apparatus for generating a scanning beam is provided. The apparatus includes a source of an apodized Mathieu beam of coherent light and a means for scanning the beam across a target optical code. The coherent apodized Mathieu beam may be created by a laser source having a Gaussian profile impinging upon a Mathieu filter in the optical path of the laser beam.

In accordance with another embodiment of the present invention, an apparatus for generating a laser beam is provided. The apparatus comprises a means for generating a beam of laser light, a means for introducing Gaussian apodization to the beam, and a means for filtering the beam to produce confocal symmetry in the beam. The means for filtering may comprise a Mathieu filter.

In accordance with yet another embodiment, the present invention provides a method for creating a Mathieu-Gaussian beam. The method comprises the steps of generating a beam, filtering the beam, and apodizing the beam. These steps may be performed in a single system either simultaneously, or in any order, to create a Mathieu-Gaussian beam. The method may include diffracting the beam to create a diffracted beam having confocal symmetry.

In accordance with a further embodiment of the present invention, a Mathieu-Gaussian laser beam is provided that has an illumination pattern with a central spot and at least one pair of side lobes. The laser beam may be approximately diffraction free and while propagating through a working distance and/or approximately constant throughout the working distance.

In accordance with another embodiment of the present invention, a laser beam for scanning a target barcode is provided. The laser beam is an apodized Mathieu beam having a central spot and at least one pair of side lobes which define a zone of illumination. The zone is elongated in a direction that is generally perpendicular to a direction in which the target barcode is scanned.

In accordance with yet another embodiment of the present invention, a method for designing a scanning laser beam source for optical code reader. In the method, a laser diode, optical system, and aperture are selected for producing a Gaussian-Mathieu beam having a central spot and at least one pair of side lobes defining a zone of illumination. The zone of illumination is relatively constant through the working range of the optical code reader, and is elongated having an aspect ration selected in accordance with the anticipated dimensions of target codes to be read by the code reader. The beam may be essentially diffraction free through the working range of the optical code reader.

BRIEF DESCRIPTION OF THE DRAWINGS

The objects and advantages of the invention will become apparent from the following detailed description of preferred embodiments thereof in connection with the accompanying drawings in which like numerals designate like elements and in which.

DETAILED DESCRIPTION OF THE PREFERRED EMBODIMENTS

The Mathieu beam, which is utilized to form a Mathieu-Gaussian beam, in accordance with an embodiment of the present invention, is represented by Mathieu functions that are exact, discrete solution of the Helmholtz wave equation.

The Helmholtz wave equation is shown below as equation 1.

$$(\nabla^2 + k^2)u = 0 \tag{1}$$

In Equation 1 above, $k=2\pi/\lambda$ is the wave number, where $\lambda$ is the wavelength of the light of the source beam. $\nabla^2$ is the Laplacian operator, which for elliptical cylindrical coordinates is given by Equation 2 below.

$$\nabla^2 = \frac{\partial^2}{\partial \xi^2} + \frac{\partial^2}{\partial \eta^2} + \frac{\partial^2}{\partial z^2} \tag{2}$$

In Equation 2 above, the Laplacian operator ($\nabla^2$) is equated to the elliptical cylindrical coordinates ($\xi$, $\eta$, z) by way of partial second derivatives (indicated by the $\partial$ operator).

Figure 1:
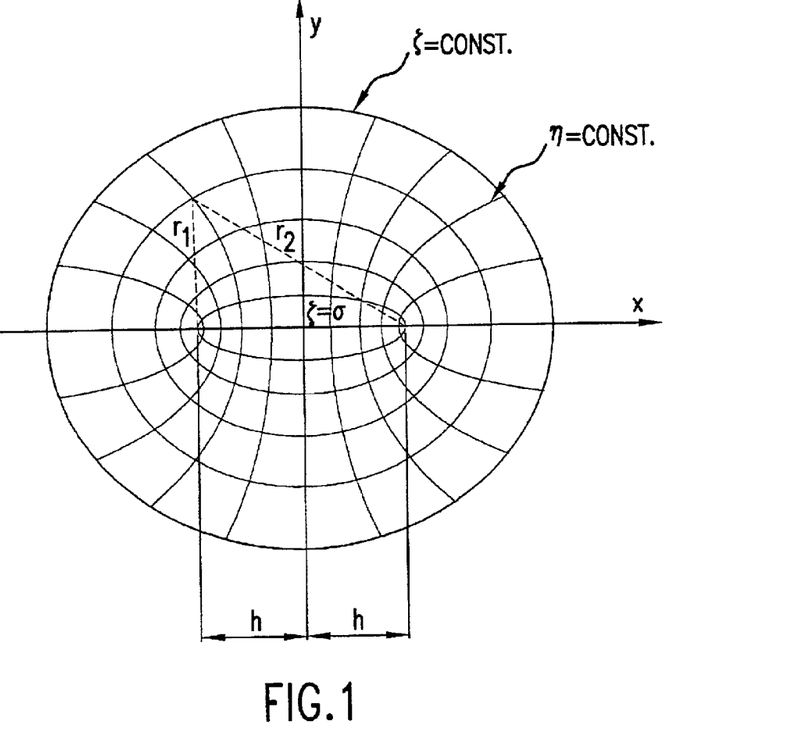
FIG. 1 is a diagram of the elliptical cylindrical coordinate system in which the Mathieu beam is readily described and analyzed.

The Helmholtz equation is separable in the elliptical cylindrical coordinates ($\xi$, $\eta$, z). These coordinates are also known as the confocal coordinates. In FIG. 1, the first two coordinates ($\xi$, $\eta$) are shown in an elliptical coordinate system, and the Cartesian coordinates (x, y) are also shown for reference. The third coordinate (z), which is the same as in the Cartesian coordinate system, is orthogonal to the $\xi$–$\eta$ plane of FIG. 1, extending outward from the page. Therefore, the ellipses shown in FIG. 1 represent constant values of $\xi$, and the Hyperbolas opening on the ±x-axis represent constant values of $\eta$, as indicated by the labels in FIG. 1.

In FIG. 1, the major axis of each ellipse corresponding to constant values of $\xi$ corresponds to the x-axis in Cartesian coordinates, while the minor axis of each ellipse corresponds to the y-axis. However, those skilled in the art will recognize that this need not be the case, and that the parameters of the Mathieu beam, as used in connection with embodiments of the present invention, may be adjusted such that the orientation of major and minor axes may be opposite that shown in FIG. 1. Moreover, the ratio of the length of major to minor axes may be adjusted according to the desired ultimate shape of the beam.

The relationship between the Cartesian coordinate system (x,y,z) and the elliptical cylindrical coordinate system ($\xi$,$\eta$,z) can be summarized by Equations 3, 4, and 5 below wherein the Cartesian coordinates are shown on the left and their confocal equivalents are expressed on the right.

$$x = h \cos h\xi \cos \eta \tag{3}$$

$$y = h \sin h\xi \sin \eta \tag{4}$$

$$z = z \tag{5}$$

In Equations 3, 4, and 5 above, $\xi$ is a radial variable such that $\xi \in [0, \infty)$, $\eta$ is an angular variable such that $\eta \in [0, \pi)$, and 2h is the interfocal separation between the focii of the ellipses of the system shown in FIG. 1. That is, each focus of the ellipses lies on the x-axis (or y-axis depending upon design choice) at a distance of h from the origin ($\xi=0$), or intersection of the x- and y-axes in the Cartesian coordinate system, as shown and labeled in FIG. 1. Two reference focal radii $r_1$, $r_2$ are shown in FIG. 1 extending from each focus, which are used for drawing each ellipse according to standard properties of ellipses.

The Helmholtz equation is separable into a longitudinal part and a transverse part in elliptical cylindrical coordinates. The longitudinal part of the Helmholz equation has a solution with dependence that varies according to $\exp(ik_z z)$.

The transverse part of the Helmholz equation is described as a function $u_t(\xi, \eta)$. The solution of the Helmholz wave equation, when separated into longitudinal and transverse parts, is shown below in Equation 6.

$$\frac{\partial^2 u_t}{\partial \xi^2} + \frac{\partial^2 u_t}{\partial \eta^2} + 2q(\cosh 2\xi - \cos 2\eta)u_t = 0 \tag{6}$$

In Equation 6 above $q = h^2 k_t^2/4$ is a constant related to the ellipticity of the confocal coordinate system, where $k_t$ is the transverse component of the wave vector $k_0$, and satisfies the dispersion relationship shown below in equation 7, and where h is half of the interfocal distance (shown in FIG. 1).

$$k_0^2 = k_t^2 + k_z^2 \tag{7}$$

In the relationship shown above in Equation 7, $k_z$ is the component of the wave vector $k_0$ in the direction of propagation.

Thus, in free space propagation, the wave propagation is of the form shown in Equation 8 below.

$$u(\xi,\eta,z;q) = u_t(\xi,\eta,q) \exp(ik_z z) \tag{8}$$

Therefore, the zero-order fundamental traveling-wave solution is given by Equation 9 below.

$$u_t(\xi,\eta,z;q) = Ce_0(\xi,q) \times ce_0(\eta,q) \tag{9}$$

The term $Ce_0$ shown above in Equation 9 is the even radial Mathieu function of the first kind, and $ce_0$ is the angular Mathieu function. It is the zero-order fundamental traveling-wave solution shown above in Equation 9 that defines the zero-order Mathieu functions.

The irradiance profile ($I_t$) of Mathieu beam can be expressed by Equation 10 below.

$$I(\xi,\eta,q) = |Ce_n(\xi,q)|^\theta \times |ce_n(\eta,q)|^\theta, \tag{10}$$

Figure 2:
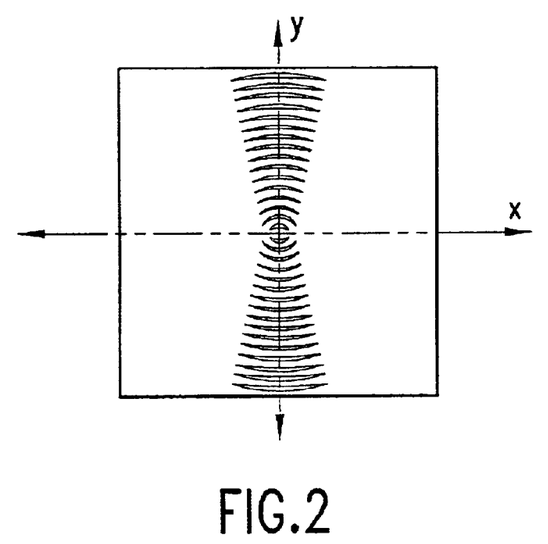
FIG. 2 is a diagram of the transverse irradiance distribution of a zero-order Mathieu beam.

The irradiance profile of the Mathieu beam described by Equation 10 above is shown in FIG. 2 with respect to the Cartesian (x, y) plane. As can be seen in FIG. 2, the transverse irradiance distribution of the zero-order Mathieu beam has an inherent elliptical symmetry, and extends for great distances in the vertical, or transverse, direction (i.e., along the y-axis). While ideal models the zero-order Mathieu beam extend infinitely in the vertical direction, in real-world physical situations, the fields exhibit a finite transverse extension. This finite nature introduces additional diffraction effects to what would be an otherwise invariant optical field (IOF). It will be recognized by those skilled in the art that the orientation of the side lobes, and the major and minor axes, is a matter of design choice that can be changed by adjusting parameters associated with creating the Mathieu beam.

It will be recognized that the transverse irradiance distribution pattern shown in FIG. 2 is limited by the constraints of reproduction. Specifically, because the portions of the beam shown in FIG. 2 adjacent the y-axis axis are so bright compared to other portions of the pattern not shown in FIG. 2, it is not possible to accurately show these other portions of the pattern. For example, although the beam illustrated in FIG. 2 appears to be a group of elliptical arches having symmetric pairs reflected across the horizontal axis, this is not the case. Rather, these apparent symmetric arch pairs are actually more like a series of co-focal ellipses that have a much greater intensity near the intersection with the y-axis than near the intersection with the x-axis. The irradiance profile of each of the ellipses, or elliptical arch pairs, illustrated in FIG. 2, therefore, peaks near the intersection of the y-axis, and decreases to zero near the intersection of the x-axis. Those skilled in the art will recognized that the orientation of the irradiance of the beam with respect to major and minor axes of the ellipse pairs can be changed according to design parameters associated with generating the Mathieu beam.

Figure 3:
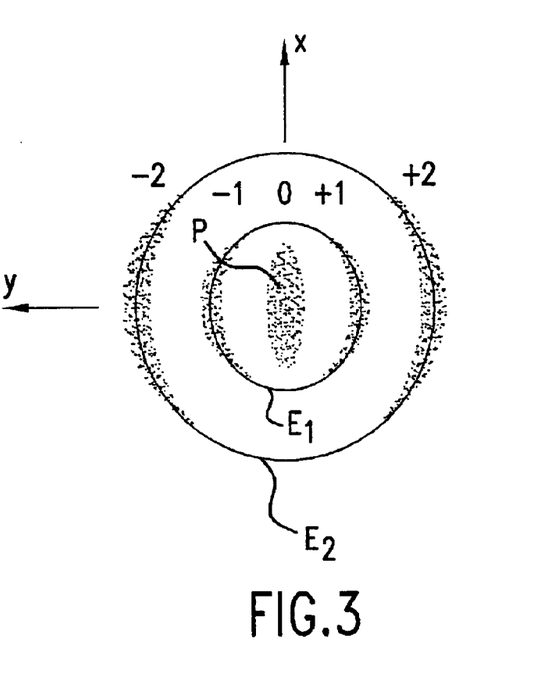
FIG. 3 is a detailed view of the central peak and first two side lobes of the Mathieu beam of FIG. 2.

FIG. 3 illustrates a detailed view of the central peak and first two side lobes of the Mathieu beam shown in FIG. 2. The portions of the beam shown in FIG. 3 are oriented at a 90 degree rotation from the beam illustrated in FIG. 2, such that the x-axis is illustrated in the vertical direction, and the y-axis is illustrated in the horizontal direction. As can be seen in FIG. 3, the central peak P (zero-order beam) and the first two side lobes (±1 and ±2 orders) are shown. As discussed above, a connection between the +1 and −1 side lobe exists, such that the ±1 side lobe pair lie on an ellipse $E_1$ and the irradiance of this side lobe pair is greatest near the intersection of the minor axis and the ellipse and goes to zero near the intersection of the major axis and the ellipse. Similarly, the ±2 side lobe pair is also connected to create an ellipse $E_2$ with yet weaker irradiance near the intersection of the major axis and the ellipse. It will be appreciated by those skilled in the art that the irradiance of each side lobe pair, shown in FIG. 3 is not necessarily represented in the proper proportion, but rather is illustrated in a manner to show the overall structure of the Mathieu beam.

For some applications, the number of side lobes displayed in FIG. 2 could be disadvantageous. For example, if the number of side lobes shown extending in the vertical direction in FIG. 2 created an overall beam envelope that was much larger than an object to be scanned (e.g., a bar of a barcode symbol), then the signal-to-noise ratio (SNR) would be decreased, which would have negative effects on attempts to image the object, or decode the symbol associated with the object. However, the narrow width and extended length of the beam provide advantageous qualities for certain applications. For example, if the number of side lobes is reduced in a manner such that the overall size of the beam envelope of the Mathieu beam better corresponds to a symbol component being scanned by the beam, an increased SNR can be achieved, resulting in more accurate reading of the optical code symbol.

For the purpose of side lobe control, therefore, Gaussian apodization is introduced to the Mathieu beam. Apodization is a process whereby secondary maxima, or unwanted side lobes, of a diffracted pattern are suppressed. In accordance with various embodiments of the present invention, Gaussian apodization may be accomplished in a variety of manners. For example, when a collimated beam source is used, a Gaussian filter may be implemented to achieve proper Gaussian apodization of a Mathieu beam. Alternatively, certain laser or coherent sources may be used directly, which have an inherent Gaussian quality, which upon impinging on a Mathieu filter have the effect of introducing Gaussian apodization upon a Mathieu beam to create a combination Mathieu-Gaussian beam.

Once the effects of Gaussian apodization have been introduced to the Mathieu beam, a Mathieu-Gaussian beam is produced having the irradiance profile given in Equation 11 below.

$$I(\xi,\eta;q) \rightarrow \exp\left(-2\frac{r^\theta}{w_\eta^\theta}\right)|Ce_\eta(\xi;q)|^\theta x |ce_\eta(\eta;q)|^\theta \quad (11)$$

The term $w_0$ is a Gaussian parameter defining the largest possible radius of the beam given the equipment used to generate it, and is generally a positive constant. The term $r^2$ is given by Equation 12 below.

$$r^\theta = x^\theta + y^\theta = h^\theta(\cos h^\theta \xi \cos {}^\theta \eta + \sin h^\theta \xi \sin {}^\theta \eta) \quad (12)$$

Figure 4A:
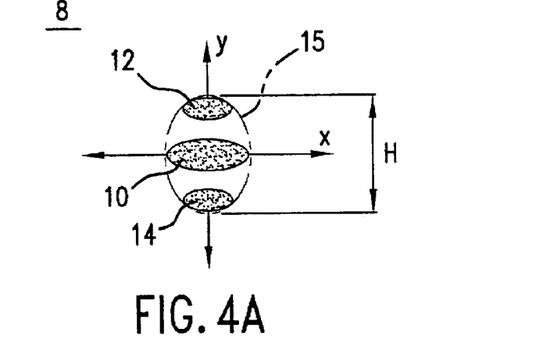
FIG. 4A is a diagram of the transverse irradiance distribution of a Mathieu-Gaussian beam oriented with its major axis aligned along the y-axis, in accordance with an embodiment of the present invention.

The approximate irradiance profile 8 of Mathieu-Gaussian beam described by Equation 11 is shown in FIG. 4A in a plane perpendicular to the direction of propagation. As can be seen in FIG. 4A, the Mathieu-Gaussian beam creates an irradiance profile 8 that is made up of three peaks which are visible as spots. The central spot 10 is oriented with its major axis along the x-axis and its minor axis along the y-axis. Likewise, two first-order side lobes 12, 14, each substantially elliptical, are shown offset equal distance along the y-axis from the central spot 10. Like the center spot, the major axes of the two side lobes 12, 14 are oriented horizontally, parallel to the x-axis, and the minor axes of the two side lobes is oriented along the y-axis.

The three spots 10, 12, 14 are arranged in such a manner that they can be considered to define a zone of illumination bounded by a broken line 15 encompassing the three spots (i.e., the central spot 10, and the first-order side lobes 12, 14). This elliptical zone of illumination has major and minor axes that are oriented at 90 degrees to the axes of the three spots 10, 12, 14. That is, the zone of illumination of the irradiance profile 8 shown in FIG. 4A is approximately elliptical and has a major axis along the y-axis and a minor axis along the x-axis. The height of the zone of illumination in the y direction is indicated by the dimension H, which in a preferred embodiment ranges from 2 to 3 mm. The ellipticity, of the zone of illumination (i.e., the ratio of x to y dimensions) is a matter of design choice and can be selected on the basis of desired system performance characteristics such working distances, expected symbol dimensions, and so forth.

Figure 4B:
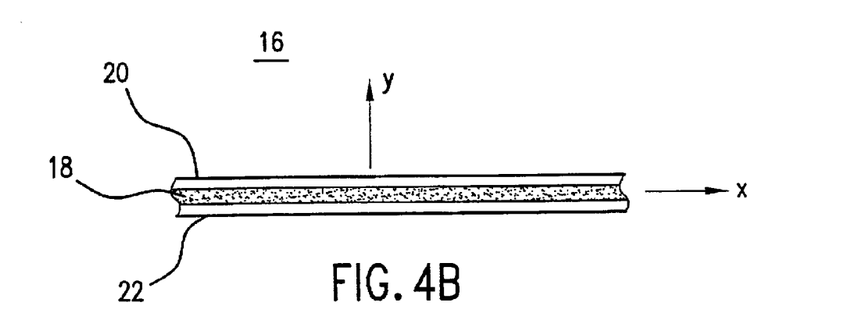
FIG. 4B is a diagram of the narrow raster scan line associated with the Mathieu-Gaussian beam having the transverse irradiance shown in FIG. 4A.

FIG. 4B shows a scan line profile 16 that may be created using the Mathieu-Gaussian beam whose irradiance profile 8 is shown in FIG. 4A. In FIG. 4B, the scan line profile takes the shape of a narrow raster scan pattern, as the Mathieu-Gaussian beam is scanned or swept in the direction of the x-axis. The scan line profile has three lines 18, 20, 22 corresponding to the spots 10, 12, 14 of the Mathieu-Gaussian irradiance profile 8. A center scan line 18 is created by the center spot 10, and a top scan line 20 and a bottom scan line 22 are created by the top side lobe 12 and the bottom side lobe 14, respectively. As the Mathieu-Gaussian beam is scanned along the x-axis direction, the zone of illumination (i.e., the envelope within which the three spots 10, 12, 14 of the irradiance profile 8 lie) creates an effective scan line having a width (in the direction of the y-axis) equivalent to the major axis of the zone of illumination, or the distance from the edge of the top spot 12 to the edge of the bottom spot 14 (i.e., its height H).

It will be recognized by those skilled in the art that the orientation of the ellipses and the zone of illumination, and the sizes of the major and minor axes, and other such parameters, may be readily adjusted depending upon the properties desired, based upon engineering constraints. Additionally, it will be recognized that the number of side lobes preserved from the Mathieu beam through Gaussian apodization may be adjusted according to the characteristics of the beam desired. While FIG. 4A is intended to illustrate the approximate irradiance profile of a Mathieu-Gaussian beam generated in accordance with an embodiment of the present invention, it is recognized that such a representation is merely illustrative, and not exact. For example, each of the spots 10, 12, 14 shown in FIG. 4A could be within a Gaussian envelope, in that the group of spots would have its greatest irradiance at its center, and its irradiance would rapidly decrease outwardly therefrom.

Using the beam in the orientation shown in FIG. 4A to create a raster scan line such as the one shown in FIG. 4B has many potential advantages. One advantage is redundancy in scanning applications is inherent in a scanner using a Mathieu-Gaussian beam having the irradiance profile 8 shown in FIG. 4A. For example, if a bar within a symbol has been damaged over the length of the entire bar except for the top portion, a normal scanning beam would see the reduced signal from such a bar as a potential error, and might not process the bar as being present. However, a scanner using a scan line, such as the raster scan line 16 shown in FIG. 4B could potentially use each of the three scan lines 18, 20, 22 independently as a type of error checking mechanism, requiring each of the lines to independently read the bars of a symbol. Thus in the example provided above, where all except the top portion of a bar has been damaged such that it cannot be read, the present invention could read the barcode properly by scanning it with the top scan line 20, even though the other two scan lines 18, 22, may not detect one or more of the bars. Therefore, the Mathieu-Gaussian beam generated in accordance with the present invention could conceivably be used to read different lines of two-dimensional symbols simultaneously, such as the PDF 417 two-dimensional barcode symbols.

Additionally, the scan lines 18, 20, 22 can be used as a single scan line for an effectively elliptical beam having the dimensions of the zone of illumination. Thus, the elliptical symmetry of the zone of illumination can be used to effectively scan symbols, such as barcodes, where the zone of illumination is selected to have a size and aspect ratio appropriate for the sizes and aspect ratios of the bars making up the anticipated target codes.

One of the advantages of the Mathieu-Gaussian beam is that the beam can propagate while maintaining a nearly constant transverse structure. That is, the Mathieu-Gaussian beam generated in accordance with the present invention, in addition to exhibiting Gaussian-like qualities, is essentially diffraction free. This is because the center spot 10 is provided with energy from the side lobes 12, 14. Because the Mathieu-Gaussian beam is not ideal, and because a limited number of side lobes is used, the central spot 10 cannot propagate infinitely without experiencing some diffraction or other spreading effects. If more side lobes are used, the beam and center spot 10 can propagate over greater distance. However, the number of side lobes that can be used is limited by the particular application for which the beam is to be used. For example, in barcode scanning, the bars in a "truncated" barcode may have an aspect ratio of as little as approximately 10:1 (height: module width). Therefore, a large number of side lobes that create a zone of illumination that has an aspect ratio greater than this is not desirable as it will decrease the signal-to-noise ratio (SNR) of the scanning system in which the Mathieu-Gaussian beam is implemented and create problems with the tilt angle of any system implement such a beam.

Figure 4C:
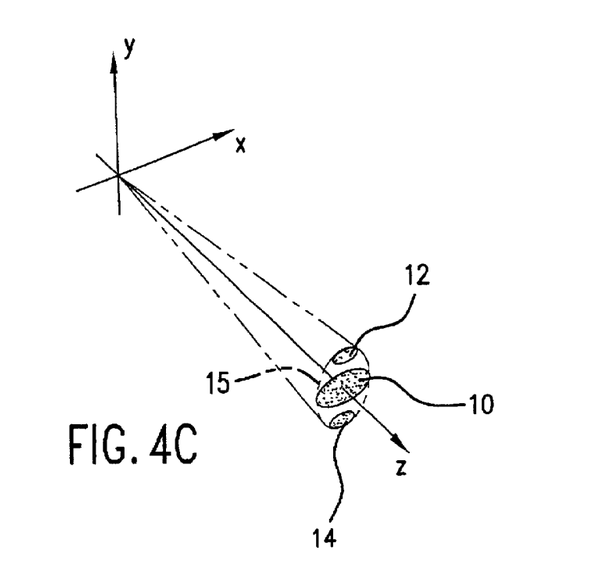
FIG. 4C is a diagram illustrating beam propagation of the Mathieu-Guassian beam having the transverse irradiance shown in FIG. 4A.

FIG. 4C is a diagram illustrating beam propagation of the Mathieu-Gaussian beam having the transverse irradiance profile 8 shown in FIG. 4A. In FIG. 4C, the Mathieu-Gaussian beam is shown propagating along the z-axis, which is perpendicular to the x-y plane (or, equivalently, perpendicular to the ξ–η plane). The three spots 10, 12, 14 propagate essentially without spreading of the overall zone of illumination or of the individual spots themselves. As discussed above, over great distances, the power in the side lobes 12, 14 will be lost due to parasitic coupling between these side lobes and the center spot 10. Eventually, after the power in the side lobes 12, 14 has been lost, the power in the center spot will diminish, and eventually disappear. However, this generally will not occur except over great distances, i.e., distances greater than those encountered in scanning optical codes. Additionally, the spreading of the Mathieu-Gaussian beam is minimal over distances where it would be used for free air, point-to-point communication. Therefore, in such distances, the Mathieu-Gaussian beam generated in accordance with an embodiment of the present invention, may be considered to be essentially diffraction-free.

Figure 5A:
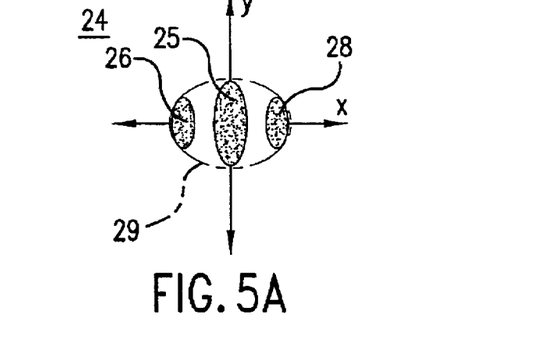
FIG. 5A is a diagram of the transverse irradiance distribution of a Mathieu-Gaussian beam oriented with its major axis aligned along the x-axis, in accordance with an embodiment of the present invention.

In FIG. 5A a diagram is presented of transverse irradiance distribution 24 of a Mathieu-Gaussian beam oriented in a manner rotated 90 degrees from the irradiance distribution 8 illustrated in FIG. 4A, such that the major axis of its zone of illumination is along the x-axis, and such that the minor axis of its zone of illumination is along the y-axis is shown in FIG. 5A. As with the irradiance distribution 8 shown in FIG. 4A, the transverse irradiance distribution 24, shown in FIG. 5A, comprises three spots 25, 26, 28, whose major axes are oriented in the direction of the y-axis, and whose minor axes are oriented in the direction of the x-axis. The central spot 25 is centered between two first-order side lobes 26, 28, which are offset from the central spot along the x-axis.

As with the irradiance distribution 8, shown in FIG. 4A, the irradiance distribution 24, shown in FIG. 5A, is not exact. For example, the irradiance distribution 24 should have three generally elliptical shaped spots that exhibit Gaussian-like qualities. Additionally, the general shape and aspect ratio of the ellipses shown in FIG. 5A is a matter of design choice, which may be adjusted based upon application needs, and engineering constraints. The irradiance distribution 24 also forms an overall zone of illumination 29 indicated by the broken line, similar to the zone of illumination 15 shown in FIG. 4B.

Figure 5B:
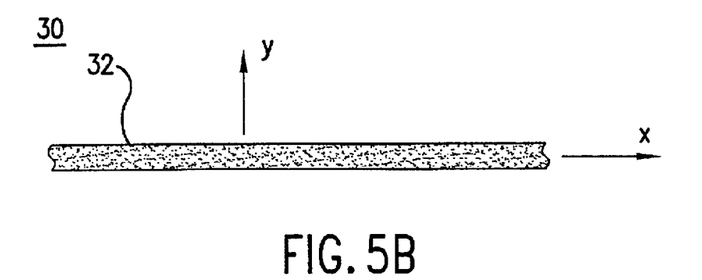
FIG. 5B is a diagram of the scan line associated with the Mathieu-Gaussian beam having the transverse irradiance shown in FIG. 5A.

FIG. 5B depicts a single scan line profile 30 produced by scanning the beam of FIG. 5A in the x direction. Thus, in FIG. 5B, the scan line 32 created is much narrower than the raster pattern of lines which would be created if the beam of FIG. 5A were scanned in the y-direction. This narrowness of the line 32, along with the fact that it is a single line is advantageous for use in many applications. For example, in scanning applications using bars having a short aspect ratio, or a diminished height-to-width ratio, a narrow scan line would be useful. Thus, in scanning two-dimensional symbols, such as PDF 417 symbols, it is possible that use of a narrower scan line, such as the one shown in FIG. 5B would be advantageous.

Figure 5C:
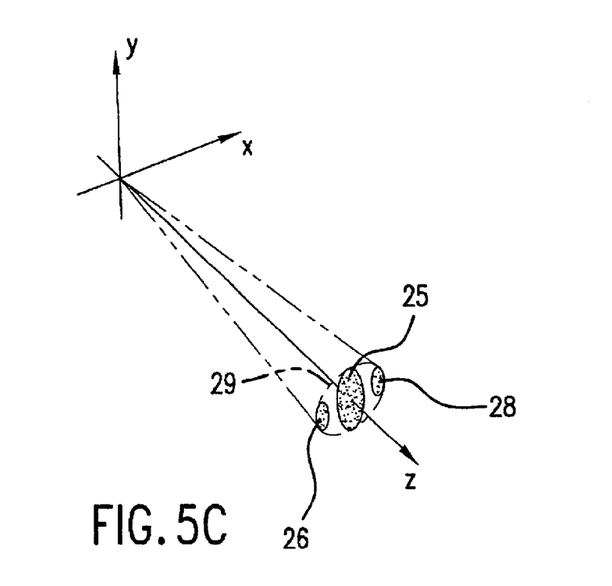
FIG. 5C is a diagram illustrating beam propagation of the Mathieu-Guassian beam having the transverse irradiance shown in FIG. 5A.

FIG. 5C is a diagram illustrating the propagation of the Mathieu-Gaussian beam along the z-axis, in a similar manner as discussed in connection with FIG. 4C. In FIG. 5C, the zone of illumination 29 propagates essentially diffraction free, and free from any spreading over the useful distances which the beam will travel for the described scanning and communications applications in connection with the embodiments of the present invention.

Figure 6:
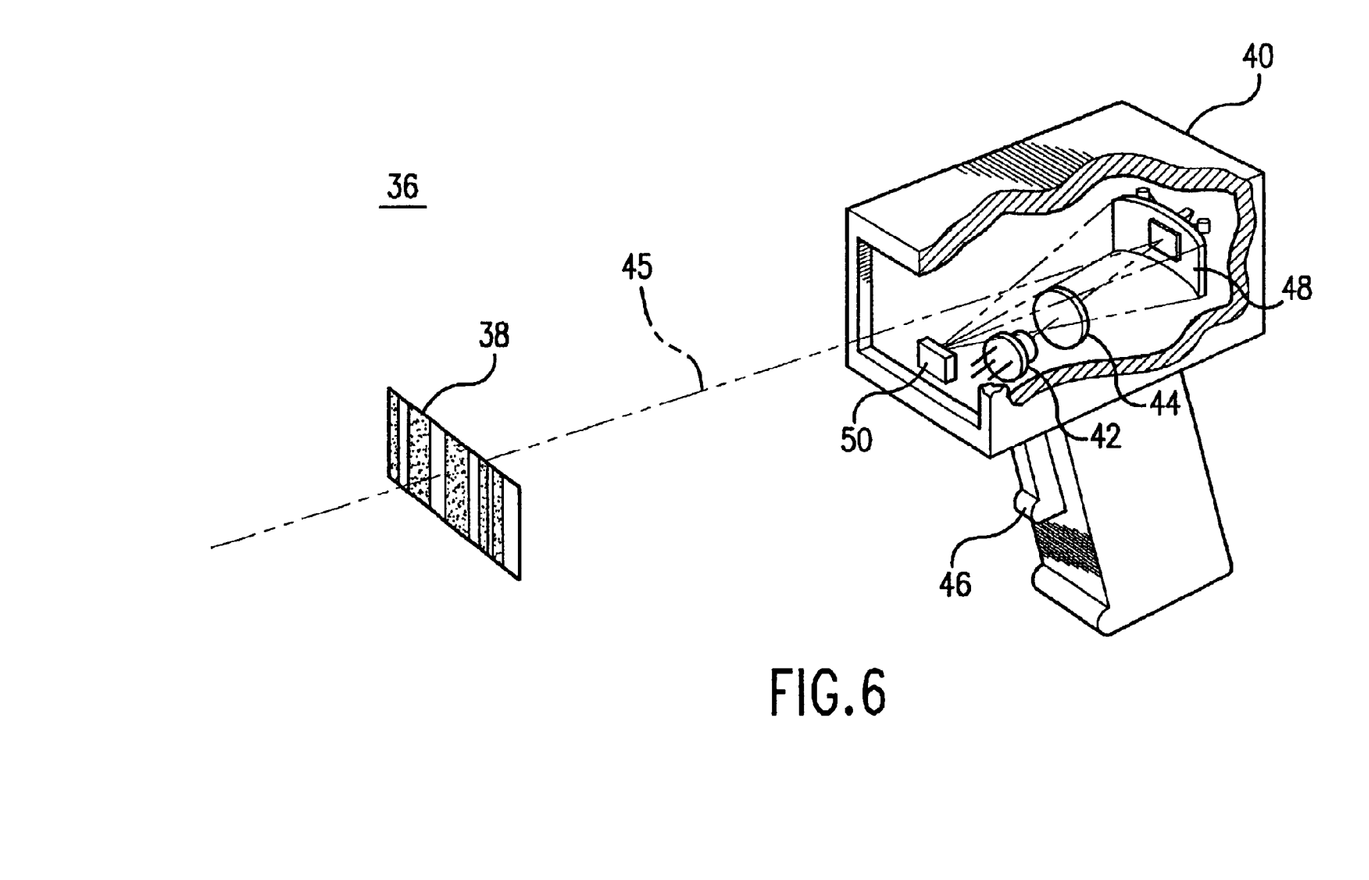
FIG. 6 is a perspective drawing of a hand-held optical scanning system in which the Mathieu-Gaussian beam of the present invention may be utilized.

In FIG. 6, a perspective view of a hand-held optical scanning system, which is used to scan a symbol 38, such as a barcode symbol, is shown. A hand-held optical scanner 40 is used, and comprises a coherent light scanning system, which has an extended working range, or depth of focus by using the Mathieu-Gaussian beam described above. In the hand-held scanner, a coherent light source 42, such as a diode laser, generates a beam of coherent light, which impinges upon a beam shaping system 44 and is transformed thereby to create the Mathieu-Gaussian beam 45 describe above. The light from the coherent light source may be activated by way of a trigger 46 or other similar device, which is operated by a user. Additionally, it is contemplated that the scanner 40 could be implemented that used sensors to begin activation of the coherent light, such as sensing the presence of a symbol, or the occurrence of some other pre-determined event.

Once the beam shaping system 44 has created the Mathieu-Gaussian beam 45, it is reflected to the symbol 38 to be read by way of an oscillating scanning mirror 48. In retro-reflection systems, light reflected by the target code symbol 38 may be reflected by the scanning mirror 48 toward a photo detector 50.

The beam source components of the scanner 40 may vary within the context of the present invention. Two embodiments are discussed below in connection with FIGS. 7 and 8. However, these embodiments are intended as merely illustrative and not restrictive, as it is contemplated that multiple configurations in addition to the embodiments described below in connection with FIGS. 7 and 8 may be used to achieve the objectives of the present invention. For example, both of the embodiments described in connection with FIGS. 7 and 8 use laser diodes as the coherent source 42; however, it is anticipated that other coherent sources could be used, such as gas lasers, spectrum light sources, and the like.

Figure 7:
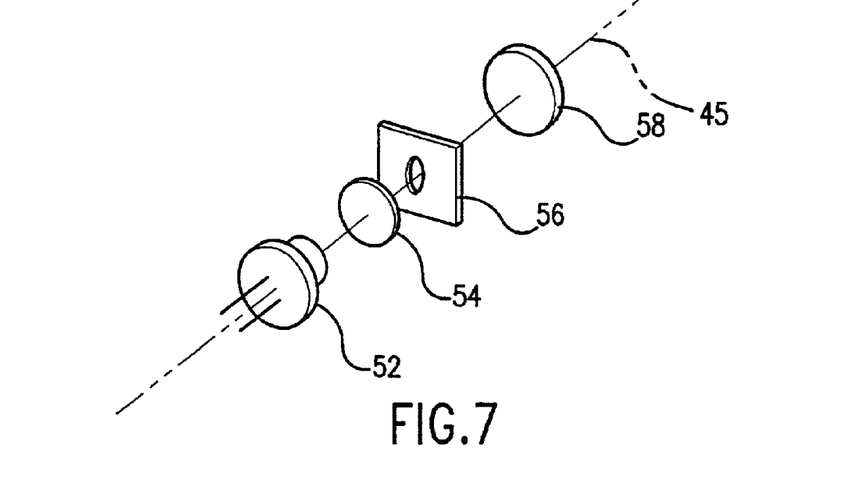
FIG. 7 is a perspective drawing of a beam generating system for use in the hand-held scanner shown in FIG. 6, using an edge-emitting laser diode in accordance with an embodiment of the present invention.

Referring to FIG. 7, components used within the scanner, in accordance with an embodiment of the present invention are shown. In FIG. 7, an edge-emitting laser diode 52 is used, which is inherently Gaussian and elliptical. This may be any suitable laser diode, such as SLD1137VP available from Sony Corporation, or SLD65018260 available from Samsung Corporation. Because of the inherent Gaussian qualities of light emitted from such a laser diode, no Gaussian filter is required for Gaussian apodization in the system illustrated in FIG. 7. The choice of the diode source may be used to determine the ellipticity of the zone of illumination, since ellipticity is affected by the relative magnitudes of the vertical and horizontal spread angles of the laser diode selected.

Light emitted from the laser diode 52 is then passed to the beam shaping system 44, which includes, in this case, a collimating lens 54, an aperture 56, and a Mathieu filter 58. The light emitted from the laser diode is collimated by the collimating lens 54, and truncated by the aperture 56. In accordance with an embodiment of the present invention, the aperture 56 is an elliptical aperture. The aperture 56 may be matched to the astigmatism of the laser diode 52 used for maximum light transfer. The light that leaves the aperture 56 and impinges upon the Mathieu filter 58 is, therefore, elliptical and Gaussian. Therefore, the incident elliptical, Gaussian light has the effect of apodizing the light that is transmitted through the Mathieu filter 58.

The Mathieu filter 58, in accordance with an embodiment of the present invention, may be a diffractive optical element or holographic optical element. The transfer function and the shape of the Mathieu filter is determined by Equation 10 above. In particular, the Mathieu filter 58 may be a computer-generated Kinoform filter. The light that leaves the Mathieu filter 58, is in the form of the Mathieu-Gaussian beam 45 describe above.

Figure 8:
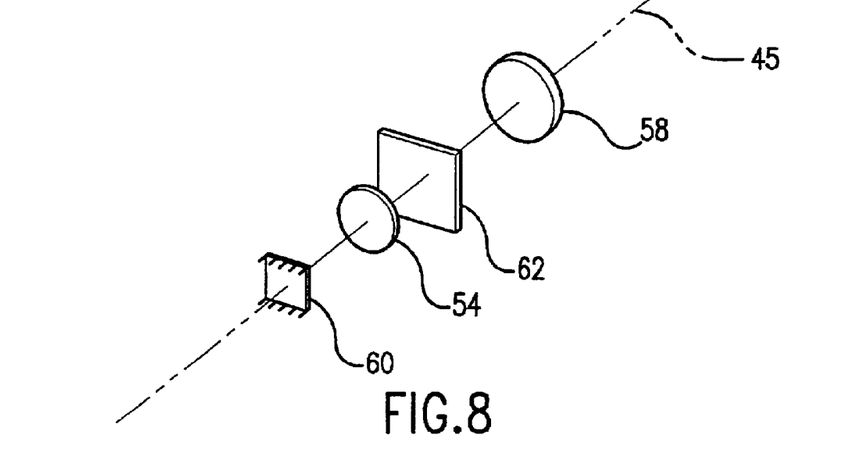
FIG. 8 is a perspective drawing of an alternative beam generator system for use in the hand-held scanner shown in FIG. 6, using a multiple vertical cavity surface emitting laser (VCSEL) array in accordance with an embodiment of the present invention.

In FIG. 8, components associated with an alternative embodiment of the present invention are illustrated. A vertical cavity surface emitting laser (VCSEL) 60 diode is used as the coherent source 42. This VCSEL may be a multiple VCSEL array, in accordance with one embodiment of the present invention. The light from the VCSEL array 60 is collimated by way of the collimating lens 54. Because the VCSEL is not astigmatic, and has circular symmetry, however, an elliptical Gaussian apodizer 62 is used to achieve the desired elliptical, Gaussian quality necessary for apodization of the Mathieu beam. The elliptical Gaussian apodizer 62 may be any filter that has a Gaussian and elliptical profile. For example, a graded neutral filter may be used with a Gaussian transmission profile. The Mathieu filter 58 may be as described above.

While the scanner 40 is discussed above in connection with scanning and detecting a symbol 38, it is contemplated that the disclosed Mathieu-Gaussian beams may also be used for communication purposes. Specifically, two such scanners could be implemented in point-to-point communications over relatively large distances by transmitting and receiving information encoded on a Mathieu-Gaussian beam created in the manner describe above. In this embodiment, data is encoded in a Mathieu Gaussian beam emitted by transmitter or scanner. The emitted beam is received and detected by a receiver or second scanner. Because of the essentially diffraction-free properties of the Mathieu Gaussian beam, a small, well-defined illuminator pattern can be transmitted for long distances permitting communication across such distances.

From the foregoing, it can be seen that the present invention provides a Mathieu-Gaussian beam of coherent light which is useful in both optical scanning and communication systems. The Mathieu-Gaussian beam is created by providing Gaussian apodization to a beam of coherent light having an irradiance distribution defined by the Mathieu function. The Mathieu-Gaussian beam of the present invention is advantageous in several respects.

First, over the working range of the beam, the beam is essentially diffraction free. Second, because of the essentially diffraction free properties of the Mathieu-Gaussian beam according to embodiments of the present invention, the zone of illumination created by the beam is nearly constant over the working range of the beam. Thus, the beam can be utilized in both the near and the far fields for optical scanning applications, and over great distances for free-space, point-to-point communication. Third, the Mathieu-Gaussian beam exhibits a raster scan pattern in the narrow field which may also be useful. Also according to the present invention, the shape of the Mathieu-Gaussian beam may be adjusted according to the desired application constraints. For example, in an optical scanning embodiment, the elongation of the zone of illumination created by the Mathieu-Gaussian beam may be changed to conform to the aspect ratio of elements within a symbol to be scanned (e.g., bars within a barcode symbol).

It will be appreciated by those of ordinary skill in the art that the present invention can be embodied in other specific forms without departing from the spirit or essential characteristics thereof. For example, the invention has been described in the context of scanning applications and free-space, point-to-point communications. However, the present invention can also be used in any environment where an essentially diffraction free beam of coherent light that maintains a constant zone of illumination over great distances is desired.

Therefore, although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. An apparatus for generating a laser beam and for scanning a target optical code, said apparatus comprising:
   a source for generating a laser beam having a Gaussian irradiance profile;
   a Mathieu filter in an optical path of the laser beam and configured to produce an apodized Mathieu beam of coherent light;
   an activation means for activating the source for generating the laser beam and propagating the laser beam towards the Mathieu filter; and
   means for scanning the apodized Mathieu beam across the target optical code by generating at least two scan lines across the target optical code.

2. The apparatus of claim 1, wherein the source for generating the laser beam with a Gaussian irradiance profile comprises:
   an edge emitting laser diode;
   a collimating lens; and
   an aperture plate.

3. The apparatus of claim 1, wherein the source for generating the laser beam with a Gaussian irradiance profile comprises:
   a VCSEL;
   a collimating lens; and
   an elliptical Gaussian apodizing filter.

4. The apparatus of claim 1, wherein the Mathieu filter creates a diffracted beam in which the irradiance of the diffracted beam is described substantially by the following equation:

$$I_t(\xi,\eta,q) = |Ce_0(\xi,q)|^2 \times |ce_0(\eta,q)|_2,$$

where $I_t$ is an irradiance profile of the diffracted beam, $Ce_0$ is the even radial Mathieu function of the first kind, $ce_0$ is the angular Mathieu function, $\xi$ and $\eta$ are the radial and angular variables of a confocal coordinate system, respectively, and $q$ is $h^2 k_t^2/4$, where $k_t$ is the transverse component of the wave vector, and $h$ is half of the interfocal distance.

5. The apparatus of claim 1, wherein the apodized Mathieu beam has an irradiance profile substantially described by the following equation:

$$I_t(\xi,\eta;q) \to \exp\left(-2\frac{r^2}{w_0^2}\right)|Ce_0(\xi;q)|^2 \, x \, |ce_0(\eta;q)|^2,$$

where $I_t$ is an irradiance profile of the diffracted beam, $Ce_0$ is the even radial Mathieu function of the first kind, $ce_0$ is the angular Mathieu function, $\xi$ and $\eta$ are the radial and angular variables of a confocal coordinate system, respectively, and $q$ is $h^2 k_t^2/4$, where $k_t$ is the transverse component of the wave vector, and $h$ is half of the interfocal distance, and where $w_t$ is a positive constant that provides a measure of width of the Gaussian term of the beam, and where $$r^2 = x^2 + y^2 = h^2(\cos h^2 v \cos^2 \eta + \sin h^2 v \sin^2 \eta).$$

6. The apparatus of claim 1, wherein the apodized Mathieu beam has confocal symmetry.

7. An optical code reading apparatus comprising:
   means for generating a beam of laser light;
   means for introducing Gaussian apodization to the beam;
   means for filtering the beam to produce a Mathieu beam having confocal symmetry and an extended working range compared to the beam of laser light, said Mathieu beam exhibits a raster scan pattern in a portion of the working range; and
   means for reflecting a beam indicative of the Mathieu beam reflected by an optical code towards a photo detector for detecting at least one line of the optical code.

8. The apparatus of claim 7, wherein the means for filtering comprises a Mathieu filter.

9. The apparatus of claim 7, wherein the output beam of the apparatus has an irradiance profile that vary substantially according to the following equation:

$$I_t(\xi,\eta,q) = |Ce_0(\xi,q)|^2 \times |ce_0(\eta,q)|^2$$

where $I_t$ is an irradiance profile of the diffracted beam, $Ce_0$ is the even radial Mathieu function of the first kind, $ce_0$ is the angular Mathieu function, $\xi$ and $\eta$ are the radial and angular variables of a confocal coordinate system, respectively, and $q$ is $h^2 k_t^2/4$, where $k_t$ is the transverse component of the wave vector, and $h$ is half of the interfocal distance.

10. The apparatus of claim 9, wherein the output beam has an irradiant profile described substantially by the following equation:

$$I_t(\xi,\eta;q) \to \exp\left(-2\frac{r^2}{w_0^2}\right)|Ce_0(\xi;q)|^2 \, x \, |ce_0(\eta;q)|^2,$$

where $I_t$ is an irradiance profile of the diffracted beam, $Ce_0$ is the even radial Mathieu function of the first kind, $ce_0$ is the angular Mathieu function, $\xi$ and $\eta$ are the radial and angular variables of a confocal coordinate system, respectively, and $q$ is $h^2 k_t^2/4$, where $k_t$ is the transverse component of the wave vector, and $h$ is half of the interfocal distance, and where $w_t$ is a positive constant that provides a measure of width of the Gaussian term of the beam, and where $$r^2 = x^2 + y^2 = h^2(\cos h^2 \xi \cos^2 \eta + \sin h^2 \xi \sin^2 \eta).$$

11. The apparatus of claim 7, wherein the means for introducing Gaussian apodization comprises is a graded neutral filter.

12. The apparatus of claim 7, wherein the output beam is an apodized Mathieu beam.

13. An optical code scanning system, comprising:
   a laser beam assembly for providing a Mathieu-Gaussian laser beam configured to produce an illumination pattern with a central spot and at least one pair of side lobes, wherein a center scan line is created by the central spot and a top and a bottom scan line are created by the at least one pair of side lobes, and wherein an optical code is scanned using at least one of the scan lines; and
   a photo detector for detecting reflected light from the optical code indicative of at least one of the center, the top and the bottom scan lines for reading at least one line of the optical code.

14. The system of claim 13, wherein the beam is approximately diffraction free while propagating through a working distance.

15. The system of claim 14, wherein the illumination pattern is approximately constant throughout the working distance.

16. An optical code reader comprising a laser beam source for generating a laser beam for scanning a target optical code, the laser beam being an apodized Mathieu beam having a central spot and at least one pair of side lobes which define a zone of illumination which zone is elongated in a direction that is generally perpendicular to a direction in which the target optical code is scanned and has an aspect ratio selected in accordance with the anticipated dimensions of target codes to be read by the optical code reader, wherein the central spot and the at least one pair of side lobes are arranged to provide at least two scan lines over the target optical code.

17. A method for designing a scanning laser beam source for an optical code reader for scanning a target optical code in which a laser diode, optical system and aperture are selected for producing a Gaussian-Mathieu beam having a central spot and at least one pair of side lobes defining a zone of illumination which is relatively constant through the working range of the optical code reader, and which zone of illumination is elongated having an aspect ratio selected in accordance with the anticipated dimensions of target codes to be read by the code reader, wherein the central spot and the at least one pair of side lobes are arranged to provide at least two scan lines each capable of independently scanning the target optical code.

18. The method of claim 17, wherein the beam is essentially diffraction free through the working range of the optical code reader.

\* \* \* \* \*